Sept. 1, 1936.   F. CARLSTEDT   2,052,967
COUNTING
Original Filed Dec. 2, 1929   2 Sheets-Sheet 1

INVENTOR
Fredrik Carlstedt
BY
Wm. J. Hedlund
his ATTORNEY

Sept. 1, 1936.　　F. CARLSTEDT　　2,052,967
COUPLING
Original Filed Dec. 2, 1929　2 Sheets-Sheet 2
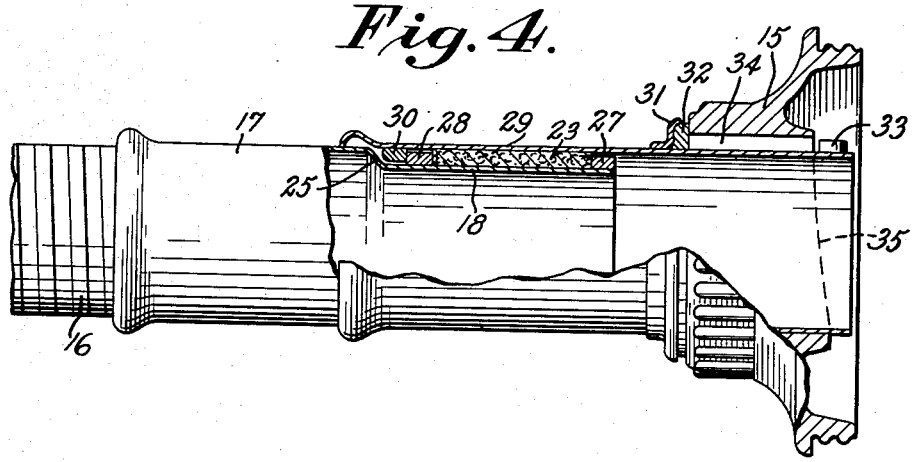
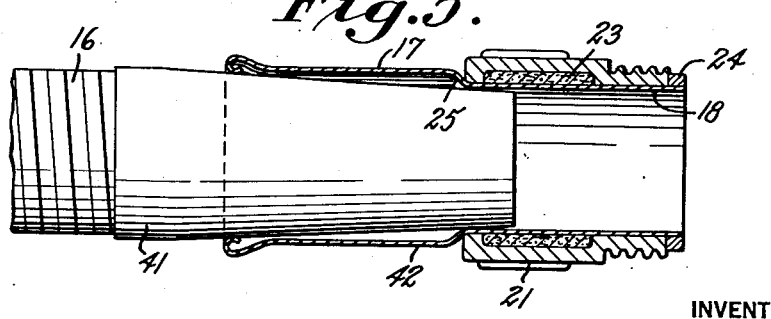
INVENTOR
Fredrik Carlstedt
BY
Wm. J. Hedlund
his ATTORNEY Patented Sept. 1, 1936

2,052,967

UNITED STATES PATENT OFFICE 2,052,967

COUPLING

Fredrik Carlstedt, Stockholm, Sweden, assignor to Electrolux Corporation, Dover, Del., a corporation of Delaware Original application December 2, 1929, Serial No. 410,960, now Patent No. 1,940,244, dated December 19, 1933. Divided and this application August 3, 1933, Serial No. 683,430. In Germany September 10, 1929

10 Claims. (Cl. 285—9)

This application is a division of my copending application Serial No. 410,960 filed December 2, 1929, now Patent 1,940,244, issued December 19, 1933.

The present invention relates to an air-hose coupling for connecting two hollow elements and may be used advantageously between an air hose and a device such as a vacuum cleaner. While the invention is applicable to vacuum cleaners of the kind disclosed in U. S. Patent No. 1,757,240 to Engberg et al., it is not limited to such application. In said patent to Engberg et al. is shown a coupling which connects the hose with the cleaner unit by frictional engagement and which is not freely rotatable in use. My invention constitutes an improvement over this coupling and provides a coupling for a gas conduit which has free rotatable movement in use while preventing flow of air between relatively rotatable parts.

My novel coupling will be more fully described in the following detailed specification taken in conjunction with the accompanying drawings forming a part of this specification and of which:

Fig. 4 is an elevational view, partially in cross-section, of another modification of my invention; and Fig. 5 is an elevational view, partially in cross-section, of a still further modified form of my invention.

Figure 1:
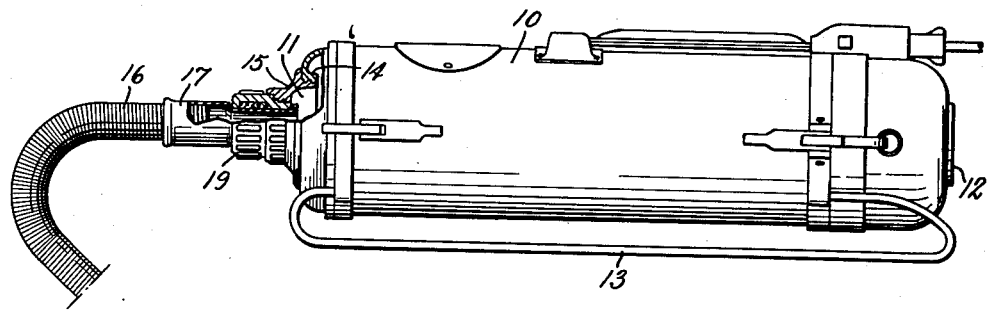
Fig. 1 is an elevational view, partially in cross-section, of a vacuum cleaner embodying a preferred form of my invention.

Referring more particularly to Fig. 1, reference character 10 indicates generally a vacuum cleaner unit which is provided with the usual electric motor, fan and dust bag enclosed in a horizontally disposed cylindrical casing and which has a suction inlet 11 and a blower outlet 12. Cleaner 10 is mounted upon a pair of runners 13 which slidably support the cleaner on the carpet. Both inlet 11 and outlet 12 are provided with similar internal screw threads 14. A reducer or coupling member 15 is provided with external screw threads and is adapted to be screwed into either inlet 11 or outlet 12 in order to reduce the size of either of these openings sufficiently to accommodate one end of a hose member 16, which serves for conducting air to the cleaner unit or away from the cleaner unit and for pulling the cleaner unit on the floor. This form of a reducer section and the advantages accruing from its use and combination with the vacuum cleaner unit are fully explained and claimed in the aforesaid Pat. No. 1,757,240 and are briefly these: When the vacuum cleaner is used as a suction cleaner it is desirable to have as large an outlet opening as is possible in order to reduce the resistance to flow of air therethrough. When the cleaner is used in this manner the size of the inlet opening is limited by the size of the hose and therefore an inlet opening of smaller cross-section than the outlet is necessary. However, when it is desired to use the cleaner unit as a blower device, it is not necessary to attach a hose to the inlet and therefore the inlet opening may be larger in order to decrease the resistance to the flow of air therethrough. At the same time it is necessary to decrease the size of the outlet opening in order to accommodate the hose. The reducer member 15 makes it possible to vary the size of the inlet and outlet openings in accordance with the above and therefore increase the efficiency of the cleaner.

Figure 2:
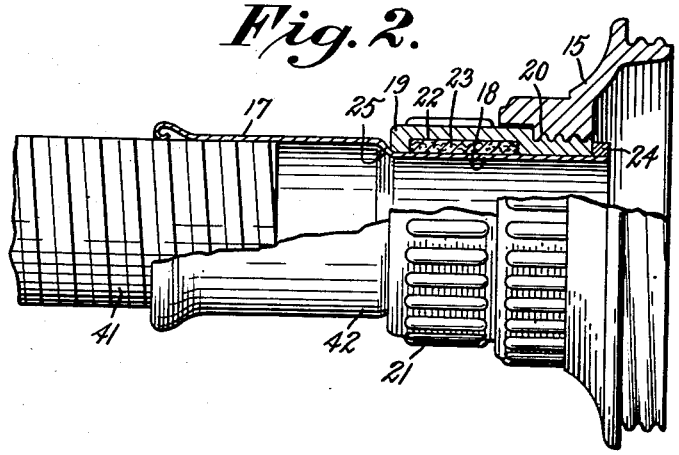
Fig. 2 is an enlarged view, partially in cross-section, of the coupling shown in Fig. 1.

Referring now to the novel features of the present application, the means of attaching hose 16 to reducer section 15 is as follows:—Hose member 16 is suitably joined to a stiff tubular member 17 so as to form an air-tight joint therewith. Tubular member 17 is formed with a reduced section 18 upon which is rotatably mounted a hollow member 19. Members 17 and 19 comprise what is conveniently termed a hose connection and is designated generally by reference character 42. Member 19 is provided with exterior screw threads 20 at what might be termed the forward end thereof and with a hand grip 21 on the other end thereof. An annular recess 22 is formed around the interior of member 19 and serves to retain a suitable packing material 23 between member 19 and tubular member 17. A ring 24 is integral with or affixed to the forward end of tubular member 17 and bears against the end of member 19 while the rear end of member 19 abuts against a shoulder 25 formed in member 17. (See Fig. 2.) Hollow member 19 is therefore rotatably mounted upon tubular member 17 while longitudinal movement between the two members is prevented and an air tight joint is secured by means of the packing 23.

In attaching hose 16 to cleaner unit 10, assuming the reducing section 15 to be screwed in place in the inlet of the cleaner, the threads 20 on hollow member 19 are engaged with the corresponding threads on the interior of section 15 and member 19 may be rotated without rotating hose 16. If, while in this position, it is desired to attach the hose to the blower end of the cleaner it is not necessary to first detach the hose from section 15 but the section may be unscrewed from its position in the inlet opening while still attached to the hose, and screwed into the outlet opening. It is obvious that hose 16 will not be rotated by this procedure, as members 15 and 19 will turn as a unit on tubular member 17.

The member 15 is made of a composition such that it will not transmit electric current. For instance, it may be made of ebonite or a phenol-condensation product. It is desirable to have this member made of such composition in order that an accidental grounding of the electric motor shall not result in transmission of electric current to the body of the user holding the flexible hose 16 or the member connected thereto.

Figure 3:
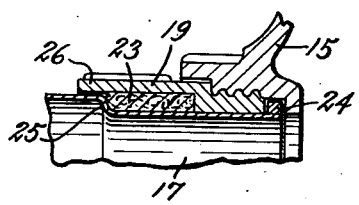
Fig. 3 is a cross-sectional view of a slightly modified form of coupling.

In Fig. 3 is shown a slightly modified form of coupling. Hollow member 19 is constructed with an offset portion 26 instead of the annular recess 22 shown in Fig. 2. The packing material 23 is held in place between this offset section and tubular member 17 and the shoulder 25 formed in the tubular member. Ring 24 is affixed to the inner end of the tubular member and this in cooperation with packing 23 and shoulder 25 prevents longitudinal movement between tubular member 17 and hollow member 19.

In Fig. 4 a type of bayonet joint is employed to attach the hose to reducer member 15 instead of a screw threaded joint. Tubular member 17 is provided with a reduced section 18 upon either end of which are affixed rings 27 and 28, similar to ring 24 of Figs. 1, 2 or 3. The hollow member 19 of the preceding figures is here replaced by a hollow member 29 which encloses the reduced section 18 of tubular member 17. Member 29 is provided with an internal ring 30 which is held between ring 28 and shoulder 25 of member 17. Packing material 23 is retained between members 17 and 29 and between rings 27 and 28. A flange 31 is affixed to the outside of member 29 and retains a packing washer 32 made of rubber or other suitable material. Mounted on the outside of member 29 near its forward end is a projection 33. The internal bore of reducer section 15 is formed with a groove 34 through which projection 33 may be passed when member 29 is inserted into section 15.

Section 15 is formed with an inclined face 35 against which projection 33 will bear when member 29 is rotated, thereby drawing washer 32 tightly against the outer end of section 15 and forming an air tight joint therewith.

In Fig. 5 is shown a modification wherein the hose is not permanently attached to tubular member 17. Hose 16 is suitably and permanently secured in a metal nozzle 41 which has a tapered end, as shown. The tapered end of nozzle 41 is adapted to be inserted in member 17 and forms an air tight frictional joint therewith. It is preferable to interpose hose connection 42 between nozzle 41 and coupling member 15 rather than to have nozzle 41 engage directly a tapered bore in member 15 because the composition coupling is, by nature, more or less brittle and does not have much resiliency. Consequently, a frictional joint directly between the metal tube and the ebonite coupling, holding only by friction, would be likely to separate under prolonged vibration incident to use of the vacuum cleaner; this for the reason that mere frictional contact between the composition and metal is not as satisfactory as a type of connection which can employ the mutual resiliency of cooperating parts. A friction connection between two concentric metal tubes of relatively thin wall section is capable of utilizing the give or resiliency of the tubes to greatly increase the surface friction. Hence, instead of engaging fitting 41 directly with member 15, hose connection 42 is interposed therebetween. Hose connection 42 not only provides a more secure coupling between the hose and the cleaner, as above pointed out, but also permits relative rotation therebetween which is of advantage when changing the hose from the suction to the blower end or vice versa. On the other hand, when it is merely desired, as is in fact usually the case, to remove the hose from the cleaner all that is necessary is to pull fitting 41 out of member 17.

Obviously, either of the above described methods of attaching hose 16 to member 17 may be employed with any of the modifications.

Thus it will be seen that a simple form of hose coupling has been provided. Vibration or dragging the cleaner unit by the hose on the carpet will not cause the hose to separate from the cleaner unit due to the firm connection. At the same time the hose may be readily detached or attached when desired and it is not necessary to detach the hose from the reducer member when it is desired to change the hose connection from the inlet to the outlet end of the cleaner or vice versa.

While I have illustrated and described several preferred embodiments of my invention, it is to be understood that further modifications thereof fall within its scope which is to be limited only by the appended claims when considered in the light of prior art.

What I claim is:

1. A rotatable air-hose coupling for connecting two hollow elements together comprising a tubular member secured to one of said elements, a hollow member mounted on said tubular member so as to be freely rotatable with respect thereto and adapted to engage the other of said elements, said hollow member being a single piece formed with an inner annular recess adjacent to said tubular member, and packing means in said recess for preventing inflow of air between said members.

2. A rotatable air-hose coupling for connecting two hollow elements together comprising a tubular member secured to one of said elements, a hollow member mounted on said tubular member so as to be freely rotatable with respect thereto, means on one end of said hollow member removably engaging the other of said elements, said hollow member being a single piece formed with an inner annular recess adjacent to the other end thereof, and packing means in said recess between said tubular member and said hollow member.

3. A rotatable air-hose coupling for connecting two hollow elements together comprising a tubular member secured to one of said elements, a hollow member formed as a single piece mounted on said tubular member so as to be freely rotatable with respect thereto, screw threads formed on said hollow member and adapted to engage threads on the other of said elements, and annular packing means between said tubular member and said hollow member.

4. A rotatable air-hose coupling for connecting two hollow elements together comprising a tubular member secured to one of said elements, said member formed with a shoulder connecting portions of different diameter, an annular projection comprising a separate member affixed to the portion of smaller diameter adjacent the end thereof remote from said shoulder, a hollow member formed as a single piece mounted on said portion of smaller diameter between said shoulder and said projection so as to be freely rotatable with respect thereto and adapted to engage the other of said elements, and annular packing means between said tubular member and said hollow member.

5. A rotatable air-hose coupling for connecting two hollow elements together comprising a tubular member secured to one of said elements, a hollow member mounted on said tubular member so as to be freely rotatable with respect thereto, screw threads formed on said hollow member adjacent to one end thereof and adapted to engage threads on the other of said elements, said hollow member being a single piece formed with an inner annular recess adjacent to the other end thereof, and packing means in said recess for preventing inflow of air between said members.

6. A rotatable air-hose coupling for connecting two hollow elements together comprising a tubular member connected to one of said elements having a laterally extending flange comprising a separate member affixed to the end thereof, an intermediate shoulder integral with said tubular member, a hollow member rotatably encircling said tubular member and forming with said tubular member an annular space surrounding said tubular member between said shoulder and said flange, and packing in said annular space, said hollow member being threaded adjacent said flange to fit internal threads on the other of said elements, and said shoulder and flange preventing longitudinal movement of said hollow member and said packing.

7. A rotatable air-hose coupling for connecting two hollow elements together comprising a tubular member secured to one of said elements, said member formed with a shoulder connecting portions of different diameter, an annular projection on the portion of smaller diameter spaced slightly from said shoulder, a hollow member mounted on said portion of smaller diameter so as to be freely rotatable with respect thereto and adapted to engage the other of said elements, an annular projection on said hollow member disposed between said shoulder and first mentioned projection, and annular packing means between said tubular member and said hollow member.

8. A rotatable air-hose coupling for connecting two hollow elements together comprising a tubular member secured to one of said elements, said member formed with a shoulder connecting portions of different diameter, a first annular projection on the portion of smaller diameter spaced slightly from said shoulder and a second annular projection on said portion of smaller diameter adjacent to the end thereof remote from said shoulder, a hollow member mounted on said portion of smaller diameter so as to be freely rotatable with respect thereto and adapted to engage the other of said elements, an annular projection on said hollow member disposed between said first projection and said shoulder, and annular packing means between said tubular member and said hollow member between said first and second projections.

9. A rotatable air-hose coupling for connecting two hollow elements together comprising a tubular member secured to one of said elements, a hollow member mounted on said tubular member so as to be freely rotatable with respect thereto, a member projecting from adjacent one end of said hollow member and adapted for engagement with the other of said elements, and annular packing means between said hollow member and said tubular member.

10. A rotatable air hose coupling for connecting together two hollow elements comprising a tubular member for attachment to one of said hollow elements and having portions of different diameters connected by a shoulder, a coupling member freely rotatable on the smaller diameter portion of said tubular member and adapted to engage the other of said hollow elements, projecting means on said tubular member spaced from said shoulder for retaining said coupling member in position substantially against said shoulder, and annular packing means between said tubular member and said coupling member.

FREDRIK CARLSTEDT.